(12) United States Patent
Bradt

(10) Patent No.: US 6,238,788 B1
(45) Date of Patent: May 29, 2001

(54) MULTI-LAYER FILM HAVING SELF LIMITING HEAT SEAL AND METHODS RELATING THERETO

(75) Inventor: Richard W. Bradt, Midlothian, VA (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 08/621,703

(22) Filed: Mar. 26, 1996

Related U.S. Application Data

(63) Continuation of application No. 08/287,604, filed on Aug. 9, 1994, now abandoned, which is a continuation-in-part of application No. 08/049,544, filed on Apr. 19, 1993, now abandoned.

(51) Int. Cl.[7] .......................... B32B 27/08; B32B 27/30; B32B 27/36

(52) U.S. Cl. .................. 428/349; 428/35.7; 428/346; 428/347; 428/353; 428/354; 428/355 R; 428/480; 428/483; 428/910; 156/308.2; 156/327; 156/332

(58) Field of Search .................... 428/35.7, 343, 428/347, 346, 349, 353, 352, 354, 480, 483, 910, 355 R; 526/317.1, 318.4, 318.44, 319, 328, 328.5, 329.5, 329.7; 156/308.2, 327, 332

(56) References Cited

U.S. PATENT DOCUMENTS

| | | | |
|---|---|---|---|
| 3,057,792 | 10/1962 | Frohlich | 204/165 |
| 3,607,816 * | 9/1971 | Holzer et al. | 260/31.2 X |
| 3,960,636 | 6/1976 | Moffitt | 156/290 |
| 4,041,206 | 8/1977 | Tsunashima et al. | 428/409 |
| 4,057,527 * | 11/1977 | Columbus | 260/29.6 WB |
| 4,139,643 | 2/1979 | Hix et al. | 426/122 |
| 4,188,443 | 2/1980 | Mueller et al. | 428/216 |
| 4,211,825 | 7/1980 | Shipman | 428/483 |
| 4,239,973 | 12/1980 | Kolbe et al. | 250/531 |
| 4,274,900 | 6/1981 | Mueller et al. | 156/229 |
| 4,410,600 | 10/1983 | McGrail | 428/483 |
| 4,504,531 | 3/1985 | Murata et al. | 428/35 |
| 4,521,467 | 6/1985 | Berger | 428/35 |
| 4,529,772 * | 7/1985 | Bruschke et al. | 524/555 |
| 4,554,303 | 11/1985 | Petke et al. | 524/277 |
| 4,571,363 | 2/1986 | Culbertson et al. | 428/332 |
| 4,788,105 | 11/1988 | Mueller et al. | 428/412 |
| 4,881,649 * | 11/1989 | Hsu et al. | 206/634 |
| 4,915,289 | 4/1990 | Hatano et al. | 229/123.1 |
| 5,059,470 * | 10/1991 | Fukuda et al. | 428/142 |
| 5,061,532 * | 10/1991 | Yamada | 428/35.7 |
| 5,156,904 | 10/1992 | Rice et al. | 428/219 |

FOREIGN PATENT DOCUMENTS

| | | | |
|---|---|---|---|
| 0175451 | 3/1986 | (EP) | 428/35 |
| 93/17863 | 9/1993 | (WO) | B32B/7/12 |

* cited by examiner

Primary Examiner—Vivian Chen
(74) Attorney, Agent, or Firm—Patricia L. Kelly

(57) ABSTRACT

A multilayer packaging film comprising:
a) a copolyester heat seal layer comprising a base polymer, wherein:
  i) 10–60 mole % of the base polymer is derived from a terephthalic acid monomer,
  ii) 10–60 mole % of the base polymer is derived from an ethylene glycol monomer, and
  iii) 5–60 mole % of the base polymer is derived from a member of the group consisting of:
   A) a diacid other than terephthalic acid;
   B) a diol other than ethylene glycol; and
   C) a mixture of A) and B);
b) an interface layer comprising an acrylic polymer;
c) a support layer;
wherein the multilayer film has a peel strength of less than 200 grams per linear inch when the heat seal layer is sealed to itself at heat sealing temperatures of above 100° C. to about 200° C.

10 Claims, 1 Drawing Sheet

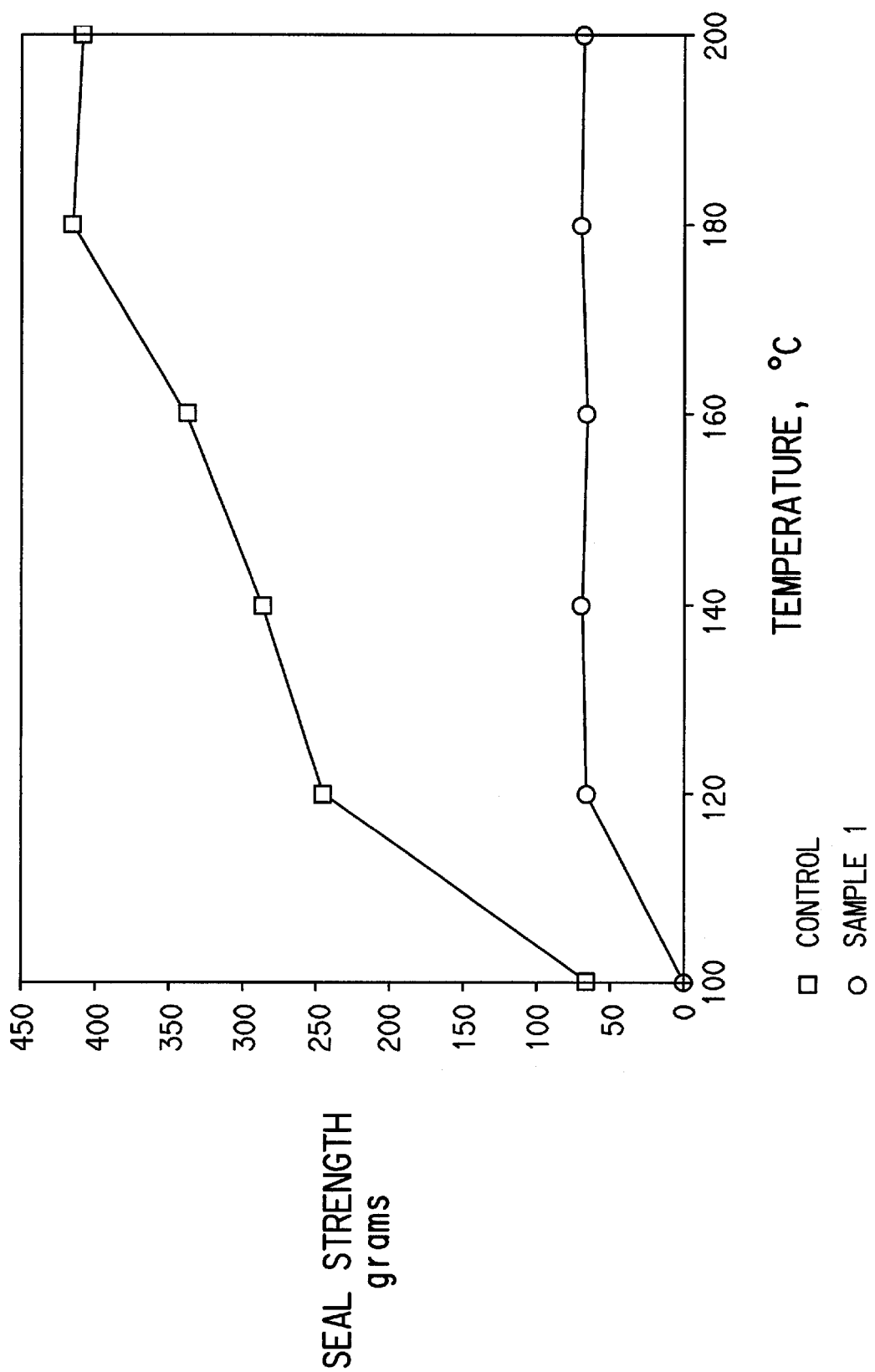

MULTI-LAYER FILM HAVING SELF LIMITING HEAT SEAL AND METHODS RELATING THERETO

This is a continuation of application Ser. No. 08/287,604, filed Aug. 9, 1994, abandoned, which is a continuation-in-part of application Ser. No. 08/049,544, filed Apr. 19, 1993, abandoned.

FIELD OF THE INVENTION

The present invention relates generally to a multilayer packaging structure which: 1. is easily recycled, 2. has a relatively broad heat seal temperature, and 3. provides an easy open seal, even at very high heat seal temperatures. More specifically, the films of the present invention are preferably multilayer structures comprising: 1. a support film, such as polyester, 2. an acrylic interface layer; and 3. a heat seal outer layer.

BACKGROUND OF THE INVENTION

"Poly vinylidene chloride ("PVDC") coated" polyester films are known and are often used as heat-sealable packaging films. However, halogenated films and coatings are increasingly coming under environmental attack and are being subjected to increasing government regulation. Also, such films generally have a rather narrow heat-sealing range (generally about 30–50° C.)—1. above this range, the package film has a tendency to tear, and 2. below this range, the packaged product may have a tendency to leak.

One possible solution to these problems is to replace the PVDC heat seal coating with other heat seal compositions. However, many heat seal compositions, such as copolyesters, can seal extremely tightly (depending upon the heat seal temperature) and thereby provide a package which is very difficult to open.

The present invention is an innovative solution to the above problems.

SUMMARY OF THE INVENTION

Overview

The present invention is directed to a novel and improved multilayer film comprising:

1. a copolyester heat seal layer;
2. an acrylic or acrylate interface layer; and
3. a support layer.

Once a heat sealing temperature is applied to the film, the peel strength of the heat seal will be advantageously limited by the interface layer. Hence, the film can be used in a wide range of heat seal applications, and the resulting heat seal will be effective in protecting the product, but not so strong as to frustrate consumers as they attempt to open the package.

BRIEF DESCRIPTON OF THE DRAWINGS

The FIGURE is a plot showing seal strength as a function of temperature for a preferred laminate according to the present invention and also for a comparative example.

DETAILED DESCRIPTION OF THE PREFERRED EMBODIMENT AND BEST MODE

Support Layer

The support layer can be virtually any material capable of carrying the interface layer and heat-seal layer without interfering with the intended function of those two layers. The preferred support layer comprises polyester, most preferably biaxially oriented poly(ethylene,terephthalate) ("oriented PET").

Useful polyester films of the present invention can be manufactured from various thermoplastic polyester resins, such as:

1. polyethylene terephthalate,
2. polytetramethylene terephthalate,
3. polyethylene, 2,6-napthalate,
4. poly-1,4-cyclohexylene dimethyl terephthalate,
5. and the like.

Polyester copolymers may also be used such as:

1. polyethylene terephthalate/isophthalate,
2. polyethylene terephthalate/adipate,
3. polyethylene terephthalate/sebacate,
4. polyethylene terephthalate/sulphoisophthalate,
5. polyethylene terephthalate/azelate,
6. and the like.

Biaxially oriented polyethylene terephthalate homopolyester is preferred.

The polyester films of the present invention can be manufactured by an extrusion process, such as a cast film or blown film process. In a cast film process, the polyester resin is first heated to a molten state and then extruded through a wide slot die in the form of an amorphous sheet. The sheet-like extrudate is rapidly cooled or "quenched" to form a cast sheet of polyester by contacting and travelling partially around a polished, revolving casting drum.

Alternatively, the extrudate can be blown in a conventional blown film process. Regardless of the process however, the polyester sheet is preferably uni-axially or biaxially (preferably biaxially) stretched in the direction of film travel (machine direction) and/or perpendicular to the machine direction (traverse direction), while being heated to a temperature range of from about 80° C. to 160° C. preferably about 90° C. to 100° C. The degree of stretching may range from 3.0 to 5.0 times the original cast sheet unit dimension, preferably from about 3.2 to about 4.2 times the original cast sheet dimension.

Definitions

As used in this specification and accompanying claims:

1. "(meth)acrylic" is intended to mean either "acrylic" or "methacrylic"; and
2. "(meth)acrylate" is intended to mean either "acrylate" or "methacrylate".

Interface Layer

The interface layer is preferably derived from a composition comprising (meth)acrylic resin. The preferred such resins are allyl esters of acrylic acid or methacrylic acid where the alkyl group has from 1–18 carbon atoms such as:

1. methyl(meth)acrylate,
2. ethyl(meth)acrylate,
3. propyl(meth)acrylate,
4. isopropyl(meth)acrylate,
5. various butyl(meth)acrylates,
6. cyclohexyl(meth)acrylate,
7. benzyl(meth)acrylate,
8. phenyl(meth)acrylate,
9. hexyl, octyl, dodecyl, hexadecyl or octadecyl(meth) acrylates,
10. lauryl(meth)acrylate,
11. and the like.

Optionally, other monomers can also be used, such as:
1. acrylonitrile,
2. methacrylonitrile,
3. acrylamide,
4. methacrylamide,
5. styrene,
6. alpha-methyl styrene,
7. vinyl toluene,
8. acrylic acid,
9. methacrylic acid,
10. maleic acid or its anhydride,
11. fumaric acid,
12. crotonic acid,
13. allyl methacrylate or acrylate,
14. allyl acetate,
15. glycidyl methacrylate or acrylate,
16. alkyl amino alkyl methacrylate, or acrylate, such as, t-butyl amino ethyl methacrylate, dimethyl amino ethyl methacrylate,
17. hydroxy alkyl acrylates or methacrylates such as, hydroxyethyl methacrylate
18. hydroxy ethyl vinyl ether,
19. hydroxyethyl vinyl sulfide,
20. vinyl pyrrolidone,
21. and the like.

Although non-crosslinking acrylic resins are preferred, crosslinking resins might be appropriate in certain embodiments of the present invention. To create a crosslinking (meth)acrylic resin, the following can be incorporated into the resin:
1. N-methylol acrylamide,
2. N-methylol methacrylamide, and
3. (meth)acrylamide.

N-methylol acrylamide and N-methylol methacrylamide are preferred due to their "self-crosslinking" ability (they are able to react with another N-methylol functional group). By contrast, acrylamide and methacrylamide alone are generally not crosslinkable, unless a second functional group is also included in the resin composition, such as:
1. melamine-formaldehyde,
2. urea-formaldehyde resin,
3. aziridines,
4. glycoluril-formaldehyde,
5. benzo guanamines,
6. acrylamide glycolic acid,
7. bis-acrylamido glyoxal,
8. diacrylamido acetic acid,
9. and the like.

If (meth)acrylamide is employed, the preferred amount of a second reactional resin such as melamine-formaldehyde or urea-formaldehyde may generally be present from about 0.1 to about 5 weight percent based on the total weight of the coating composition.

The preferred (meth)acrylic resin of the present invention comprises about 65 mole % methyl methacrylate, about 33 mole % ethyl acrylate and about 2 mole % acrylic acid and would also include variations and derivations thereto.

Generally speaking, adhesion chemistry is often difficult to predict. Hence ordinary skill and experimentation may be necessary in discerning all possible embodiments of the present invention, depending upon the desired heat seal performance for any particular application of the present invention.

Although it would be impossible for Applicant to test every possible acrylic material to determine its effectiveness in this particular application, once an ordinary artisan reads this specification and accompanying claims and thereby learns of the advantages of using an (meth)acrylic interface layer to modify heat seal peel strength, such an artisan will easily be able to undertake routine experimentation in discerning new embodiments of the present invention.

Preferably, the interface layer is applied as a coating by means of an emulsion or dispersion, using an appropriate solvent.

In addition to the (meth)acrylic copolymer, the interface layer composition may also contain other materials commonly used and known in the art, such as antioxidants, tackifiers, stabilizers, fillers, extender resins, waxes, foaming agents, crosslinking agents, elastomers, and the like.

The (meth)acrylic resins of the present invention are generally available in the marketplace. Alternatively, they can be synthesized by emulsion polymerization using conventional techniques.

Support Layer+Interface Layer

The interface layer is preferably applied to the support layer by conventional coating techniques. Prior to coating the polyester film surface, the film may be surface-treated in any conventional manner, depending upon the particular application and performance required from the final product.

Electric corona discharge is a conventional surface treatment which is commonly performed on polyester films to enhance the film's surface qualities, especially its adhesive and printing properties. Electric corona discharge methods and apparatus are described in U.S. Pat. Nos. 3,057,792 and 4,239,973.

For uniaxially oriented film, the corona treatment followed by the coating may occur during the in-line manufacturing process, either before stretch orientation heating the film before stretch orientation will generally be necessary to drive off the coating solvent.

The polyester sheet can be coated with the interface layer using any of the well known coating techniques. For example, the film may be coated by roller coating, spray coating, gravure coating, slot coating, or extrusion coating preferably gravure or roller coating. The heat applied to the film during the subsequent preheating, stretching, and heat-setting stages is generally sufficient to evaporate the coating solvent and crosslink the acrylic coating, if a crosslinkable monomer comprised a portion of the acrylic coating.

The coated, oriented polyester film may then be heat treated for a period of time necessary to crystallize the film. Crystallization imparts dimensional stability and good tensile properties to the polyester film. Oriented polyethylene terephthale film may be heat set at a temperature ranging from 190° C. to 240° C., preferably from 215° C. to 235° C. The coated crystalline, oriented polyester film is generally then wound onto a roll.

An alternative to this on-line process is to coat the film off-line (after manufacture of the film is complete). Off-line operations can be conducted by a secondary facility, such as a converter, who obtain intermediate films and further processes it for specific customers.

Copolyester Component

The copolyester component of the present invention is derived from at least the following components:
1. about 10–60 mole % terephthalic acid (hereafter, monomer "A")
2. about 10–60 mole % ethylene glycol (hereafter, monomer "B"); and
3. about 5–60 mole % of third monomer being a secondary di-acid (hereafter monomer "C" and/or a secondary diol (hereafter monomer "D"), wherein,
1. the intrinsic viscosity of the final copolyester composition is preferably in the range of about 0.5–1.0, more preferably 0.58–0.8; and
2. the glass transition temperature of the final composition is less than about 100° C., more preferably, less than about 80° C., and most preferably less than about 75° C.

Examples of monomer C include:
1. succinic acid,
2. adipic acid,
3. azelaic acid,
4. sebacic acid,
5. 1,10 decanedicarboxylic acid,
6. phthalic acid,
7. isophthalic acid,
8. dodecanedioic acid,
9. and the like.

Preferred such comonomers include azelaic and isophthalic.

Examples of monomer D include:
1. methoxypolyalkylene glycol
2. neopentyl glycol
3. propylene glycol,
4. 1,4 butane diol,
5. trimethylene glycol,
6. propylene glycol,
7. tetramethylene glycol,
8. hexamethylene glycol
9. diethylene glycol
10. and the like.

Generally speaking, the heat seal layer will heat seal to itself at temperatures greater than about 100° C., and the peel strength of the heat seal will increase with increasing heat sealing temperatures. Generally, the peel strength will exceed 200 grams per inch at heat seal temperatures above about 100° C. However, the interface layer will provide "easy opening" delamination with a peel strength less than about 200 grams per inch, even at heat seal temperatures of 180° C. or higher. Hence, the packaging films of the present invention utilize the advantageous heat seal temperature ranges of copolyester heat seal materials, while overcoming the problem of consumer frustrations involving "difficult to open" packages.

EXAMPLE 1

Support Layer: biaxially oriented polyethylene terephthalate, 0.5 mil thickness (hereafter, SUPPORT LAYER)

Interface Layer: a polymer of 65 mole % methyl methacrylate, 33 mole % ethyl acrylate and 2 mole % acrylic acid (hereafter, INTERFACE MATERIAL 1)

ADCOTE X5-183A™ from Morton International which is believed to comprise styrene and acrylic acid (hereafter, INTERFACE MATERIAL 2)

2MAAF™ from ABCO Chemicals which is a crosslinking acrylic resin, combined with 5 weight % (based on 2MAAF™ solids) of melamine formaldehyde (hereafter, INTERFACE MATERIAL 3)

Heat Seal Layer: 49002™ copolyester available from Morton International which is believed to be the polymerization product of ethylene glycol with a diacid composition comprising about 45 mole % azelaic acid and about 55 mole % terephthalic acid hereafter, COPOLYESTER A), and VITEL 1200™ available from Shell Chemical which is believed to be the polymerization product of ethylene glycol with diacid composition comprising about 45 mole % isophthalic acid and 55 mole % terephthalic acid (hereafter COPOLYESTER B)

CONTROL FILM: a 50/50 weight blend of Copolyester A and Copolyester B was solution coated onto the Support Layer in an amount of about 1 gram copolyester per square meter of support layer.

SAMPLE 1: the Support layer was solution coated with the Interface Material in an amount of about 0.1 to 0.5 grams Interface Material 1 per square meter of Support Layer; thereafter the interface coating was solution coated with the copolyester material used in the Control in an amount of 1 gram copolyester per square meter.

SAMPLE 2: was substantially the same as Sample 1, except that Interface Material 2 was substituted for Interface Material 1.

SAMPLE 3: was substantially the same as Sample 1, except that Interface Material 3 was substituted for Interface Material 1.

Equipment

The coating equipment used 12 inch wide feed rolls, coating rolls, and a drying tower at about 104° C. (220° F.) (counter-current air drying) for samples 1 and 2, and 150° C. for sample 3. The interface coating solutions were about 7.5 to about 15 weight percent solids in an aqueous solution at ambient temperature. The copolyester coating solutions were about 10 to about 20 weight percent solids in a tetrahydrofuran solution comprising about 1.5 weight percent fillers, waxes, stabilizers and the like at about 50° C. An 11 inch wide PET film was fed into the coating bath at about 50 feet per minute, and a dwell time during drying of about 0.2 minutes.

Results

Each of the multi-layer films was heat sealed at a temperature of about 120° C. The Control had a peel strength in excess of about 200 g/inch. Samples 1,2 and 3 had peel strengths in the range of about 50–100 g/inch.

Peel strengths above about 50 g/inch are generally sufficient to seal a package for typical use, and seals having peel strengths above about 200 g/inch are generally rather difficult for an average consumer to pull apart. Samples 1, 2 and 3 indicate excellent heat seal performance.

The control and sample 1 were each heat sealed at temperatures of from about 100 to 200° C. Seal strength in grams per inch are plotted against heat seal temperature in the Figure. The film of sample 1 had excellent seal strength over the broad range from 102° C. to 200° C. The control film seals were stronger than desired over the same temperature range.

What is claimed is:

1. A multi-layer film comprising:
   a) a copolyester heat seal layer comprising a base polymer, wherein:
   i) 10–60 mole % of the base polymer is derived from a terephthalic acid monomer,
   ii) 10–60 mole % of the base polymer is derived from an ethylene glycol monomer, and
   iii) 5–60 mole % of the base polymer is derived from a member of the group consisting of:
   A) a diacid other than terephthalic acid;
   B) a diol other than ethylene glycol; and
   C) a mixture of A and B;

b) an interface layer comprising an acrylic polymer, the acrylic polymer derived from an acrylic acid monomer, a methacrylic acid monomer, an alkyl ester of acrylic acid monomer or an alkyl ester of methacrylic acid monomer; and c) a support layer;

said multi-layer film is characterized by:

a heat seal defining a delamination with a peel strength of less than 200 grams per linear inch upon overlapping the film and placing the heat seal layers in contact with one another and heating the film to a heat sealing temperature in the range of above 100° C. to about 200° C.

2. The multi-layer film of claim 1, further characterized by:

a heat seal defining a delamination with a peel strength of less than about 100 grams per linear inch upon overlapping the film and placing the heat seal layers in contact with one another and heating the film to a temperature in the range of above 100° C. to about 200° C.

3. The film of claim 1, wherein the support layer comprises oriented polyethylene terephthalate.

4. The film of claim 1, wherein the interface layer comprises an alkyl ester of (meth)acrylic acid.

5. The film of claim 1, wherein the interface layer comprises:

a) methyl (meth)acrylate or ethyl (meth)acrylate, and b) acrylic acid.

6. The film of claim 1, wherein the interface layer comprises methyl (meth)acrylate or ethyl (meth)acrylate.

7. The film of claim 1, wherein the heat seal layer is a blend of copolyesters.

8. A process for heat sealing the multi-layer film of claim 1 to effect a heat seal with a consistently low peel strength over a broad heat sealing temperature range, said process comprising:

a) contacting said multi-layer film with a copolyester surface layer; and b) heat sealing said multi-layer film with said copolyester surface layer at a temperature effecting a heat seal between said film and said copolyester surface; whereby:

said heat seal defines a delamination with a peel strength of less than 200 grams per linear inch upon heating the film to a heat sealing temperature in the range of above 100° C. to about 200° C.

9. A covered package comprising a package and a lidding cover film heat sealed thereto, the film comprising:

a) a copolyester heat seal layer comprising a base polymer, wherein:

i) 10–60 mole % of the base polymer is derived from a terephthalic acid monomer, ii) 10–60 mole % of the base polymer is derived from an ethylene glycol monomer, and iii) 5–60 mole % of the base polymer is derived from a member of the group consisting of A. a diacid other than terephthalic acid;

B. a diol other than ethylene glycol; and

C. a mixture of A and B, b) an interface layer comprising an acrylic polymer, the acrylic polymer derived from an acrylic acid monomer, a methacrylic acid monomer, an alkyl ester of acrylic acid monomer or an alkyl ester of methacrylic acid monomer, and c) a support layer;

wherein the combination of a), b) and c) provides a heat seal defining a delamination with a peel strength of less than 200 grams per linear inch upon heating the film to a heat sealing temperature in the range of above 100° C. to about 200° C.

10. The covered package of claim 9, wherein the combination of a), b) and c) provides a heat seal defining a delamination with a peel strength of less than about 100 grams per linear inch upon heating the film to a heat sealing temperature in the range of above 100° C. to about 200° C.

* * * * *